(12) United States Patent
Heideman et al.

(10) Patent No.: US 9,020,317 B2
(45) Date of Patent: Apr. 28, 2015

(54) SURFACE WAVEGUIDE HAVING A TAPERED REGION AND METHOD OF FORMING

(71) Applicant: Octrolix BV, Enschede (NL)

(72) Inventors: Rene Gerrit Heideman, Oldenzaal (NL); Arne Leinse, Borne (NL)

(73) Assignee: Octrolix BV (NL)

( * ) Notice: Subject to any disclaimer, the term of this patent is extended or adjusted under 35 U.S.C. 154(b) by 0 days.

(21) Appl. No.: 14/051,715

(22) Filed: Oct. 11, 2013

(65) Prior Publication Data

US 2014/0105556 A1   Apr. 17, 2014

Related U.S. Application Data

(60) Provisional application No. 61/712,587, filed on Oct. 11, 2012.

(51) Int. Cl.
*G02B 6/10* (2006.01)
*G02B 6/30* (2006.01)
*G02B 6/14* (2006.01)

(52) U.S. Cl.
CPC . *G02B 6/305* (2013.01); *G02B 6/14* (2013.01)

(58) Field of Classification Search
CPC .................. G02B 6/1228; G02B 2006/12097; G02B 6/122; G02F 1/025; G02F 1/035; G02F 1/225; G02F 1/2257; H01S 5/1014
USPC .............. 385/129–132, 31, 39, 43; 427/163.2
See application file for complete search history.

(56) References Cited

U.S. PATENT DOCUMENTS

| | | | |
|---|---|---|---|
| 6,411,764 B1 * | 6/2002 | Lee | 385/131 |
| 6,768,855 B1 | 7/2004 | Bakke et al. | |
| 7,583,869 B2 * | 9/2009 | Kang et al. | 385/14 |
| 7,643,710 B1 * | 1/2010 | Liu | 385/43 |
| 7,664,352 B1 | 2/2010 | Okayama | |
| 8,412,007 B2 * | 4/2013 | Lee et al. | 385/14 |
| 8,718,432 B1 * | 5/2014 | Heideman et al. | 385/131 |
| 2003/0068152 A1 * | 4/2003 | Gunn, III | 385/129 |
| 2003/0206694 A1 | 11/2003 | Babin et al. | |
| 2006/0285797 A1 * | 12/2006 | Little | 385/43 |
| 2007/0077017 A1 * | 4/2007 | Menon et al. | 385/129 |
| 2007/0230873 A1 | 10/2007 | Little | |
| 2007/0280616 A1 * | 12/2007 | Patel et al. | 385/130 |
| 2010/0086255 A1 | 4/2010 | Ishizaka | |
| 2012/0224820 A1 * | 9/2012 | Onishi | 385/131 |

OTHER PUBLICATIONS

"Related EP Patent Application No. EP 13 18 8394", "Extended Search Report", Apr. 14, 2014, Publisher: EPO, Published in: EP.
Uppal, et al., "Study of 1.3-MUM Tapered Waveguide SpotSize Transformers", "Journal of Selected Topics in Quantum Electronics", Jun. 3, 1997, pp. 975-979, vol. 3, No. 3, Publisher: XP000727347, IEEE Service Center ISSN: 1077-260X, DOI: 10.1109/2944.640652, Published in: US.

* cited by examiner

*Primary Examiner* — Ellen Kim
(74) *Attorney, Agent, or Firm* — Kaplan Breyer Schwarz & Ottesen, LLP

(57) ABSTRACT

A method for forming a waveguide having a thin-core region, a thick-core region, and a transition region of tapered thickness between them is disclosed. The method comprises forming a lower core layer of a first material on a lower cladding, forming a thin central core layer of a second material on the first core layer, forming an upper core layer of the first material on the central core layer, and etching the upper core layer in an etchant such that it is removed from the thin-core region and its thickness monotonically changes from its as-deposited thickness to extinction across the transition region, where the central core layer protects the lower core layer from exposure to the etchant.

20 Claims, 7 Drawing Sheets

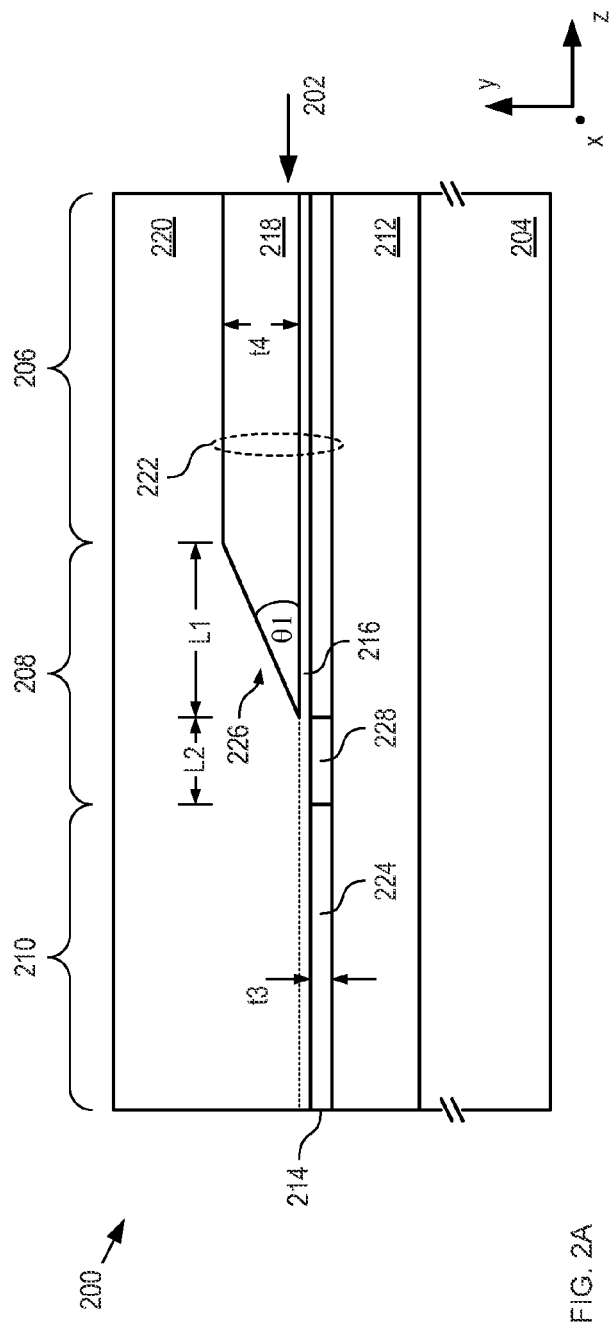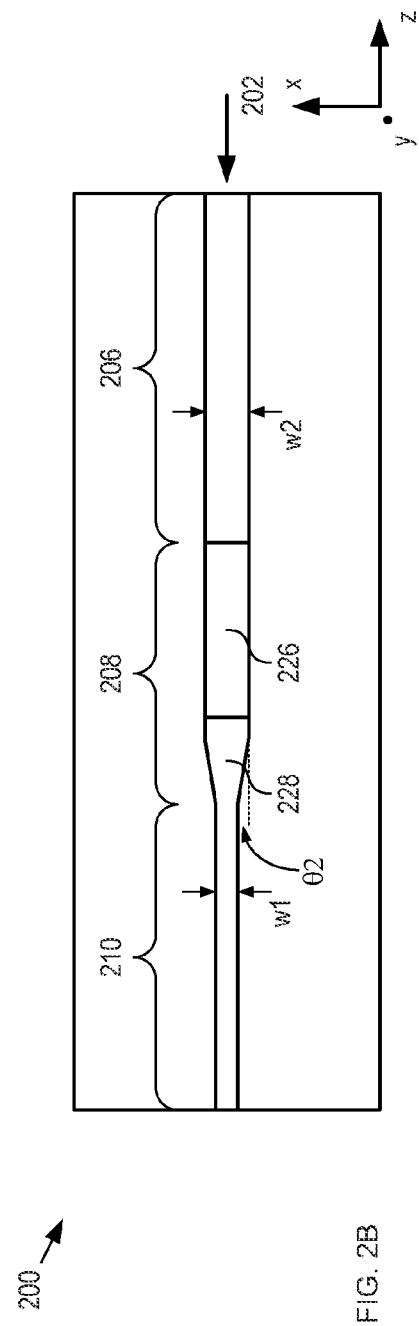

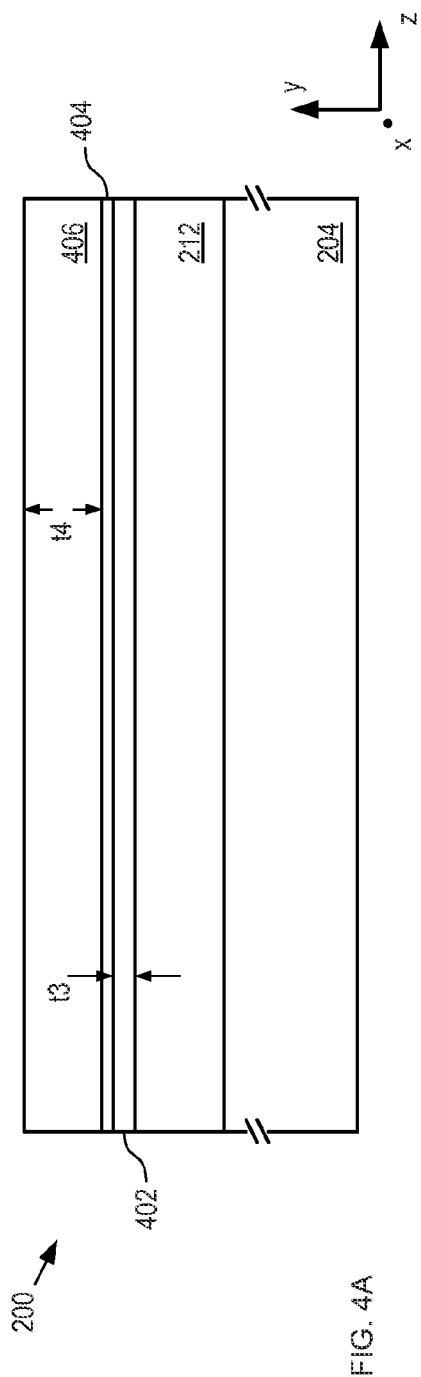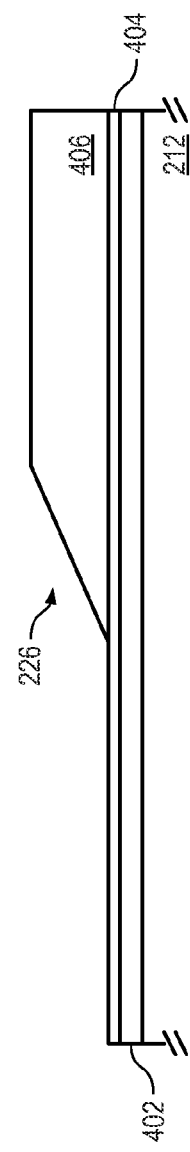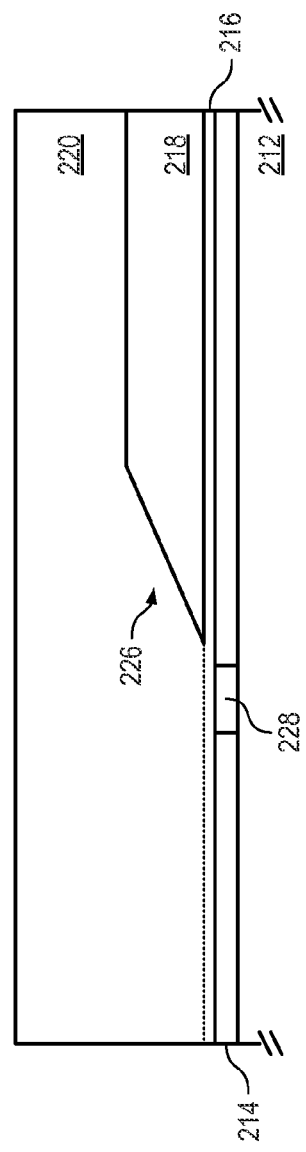

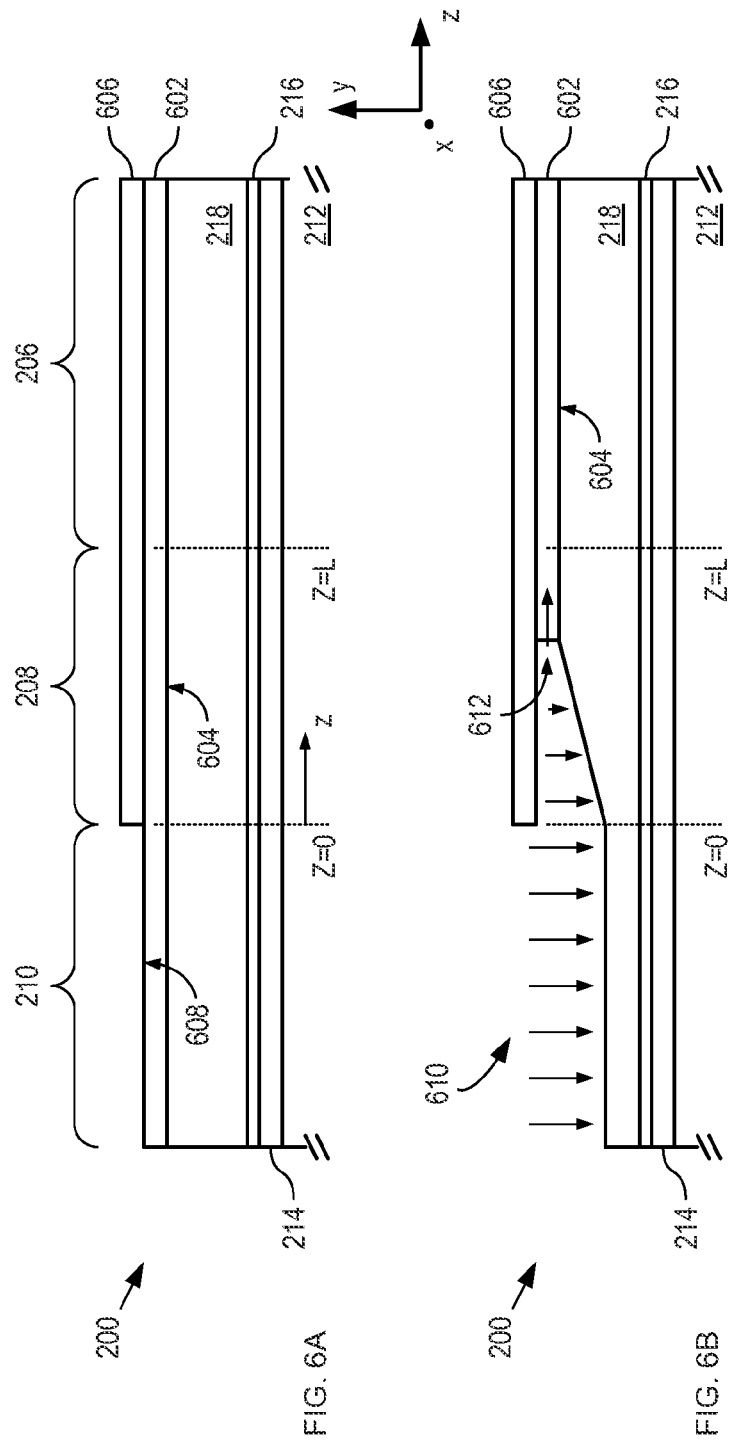

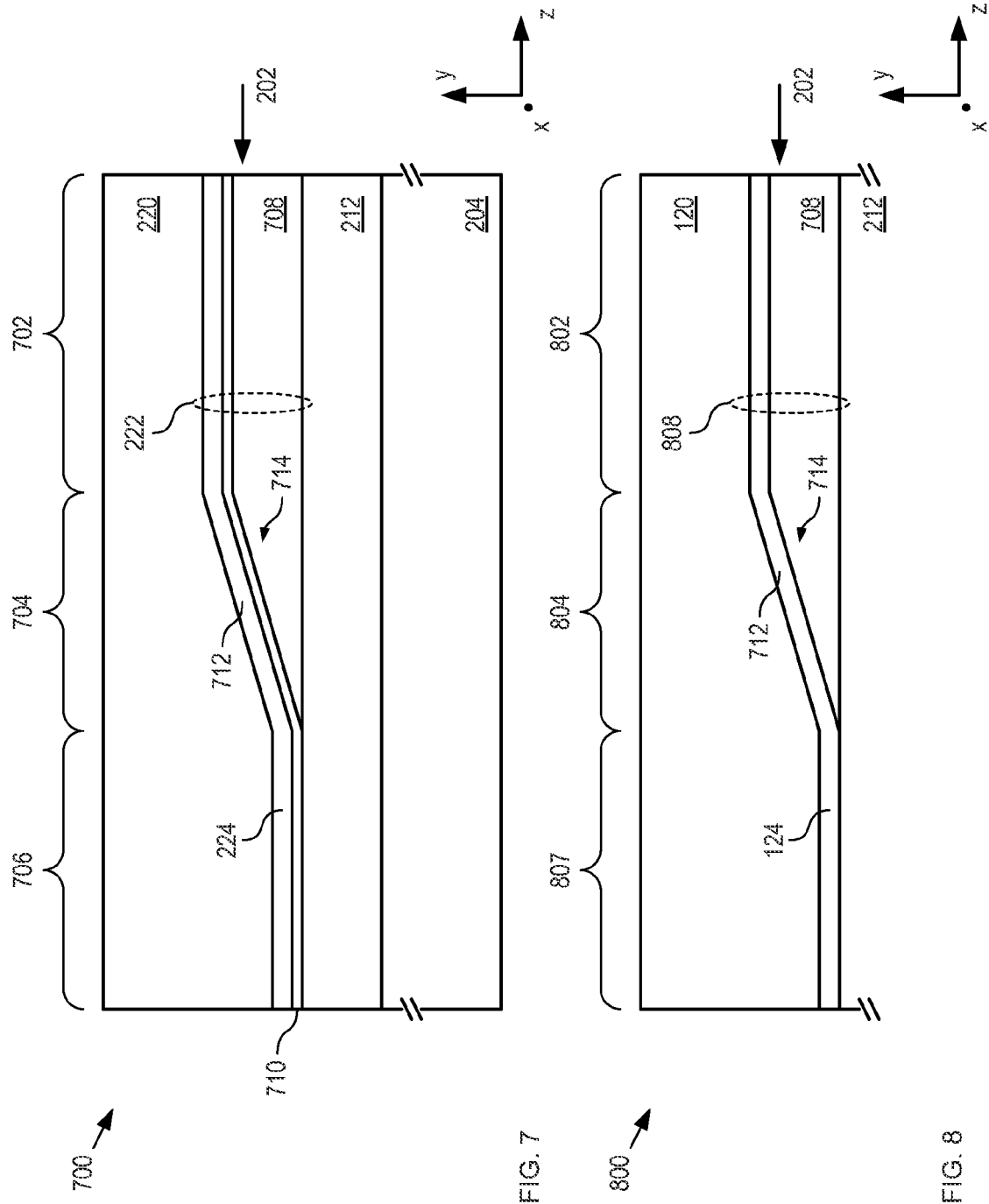

SURFACE WAVEGUIDE HAVING A TAPERED REGION AND METHOD OF FORMING

CROSS REFERENCE TO RELATED APPLICATIONS

This case claims priority of U.S. Provisional Patent Application Ser. No. 61/712,587, filed Oct. 11, 2012, which is incorporated by reference.

In addition, the underlying concepts, but not necessarily the language, of the following cases are incorporated by reference:

(1) U.S. Pat. No. 7,146,087, issued Dec. 5, 2006; and
(2) U.S. Pat. No. 7,142,759, issued Nov. 28, 2006.

If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to integrated optics in general, and, more particularly, to surface waveguide structure and technology.

BACKGROUND OF THE INVENTION

Planar Lightwave Circuits (PLCs) are optical systems comprising one or more waveguides integrated on the surface of a substrate, wherein the waveguides can be combined to provide complex optical functionality. These "surface waveguides" typically include a core of a first material that is surrounded by a second material having a refractive index that is lower than that of the first material. As a result, light propagating through the core of a surface waveguide is guided along the waveguide by the core due to internal reflection at the interface between the core and cladding materials.

Historically, surface waveguides have been based on materials whose refractive indices were only slightly different (<1%). Such "low-contrast waveguides" are typically based on a core comprising doped silicon dioxide, where the doping provides a slight increase in refractive index from an undoped silicon dioxide cladding. Low-contrast waveguides were developed for use in telecommunications systems, where low propagation loss is critical. Low-contrast waveguides can have propagation losses less than 0.1 dB/cm.

Because the refractive index difference between the core and cladding materials is small, light is only loosely confined in the core of a low-contrast waveguide and a significant portion of its optical energy extends well out into the cladding as an evanescent tail. As a result, the mode-field profile of a light signal (i.e., the distribution of optical energy about the central axis of the waveguide) propagating in a low-contrast waveguide is quite large. It is fairly well matched to that of a conventional optical fiber, however. Low-contrast waveguides, therefore, can optically couple light into and out of a conventional optical fiber with very low loss. This high coupling efficiency enables inclusion of low-contrast waveguide-based PLCs in the optical fiber plant that forms the backbone of modern telecommunications and data communications networks.

Unfortunately, the large mode-field profile can lead to light leaking out of the waveguide—particularly at tight bends and loops. As a result, low-contrast waveguides are normally routed along the substrate using large bending radii. Further, to avoid overlap of the mode-field profiles of adjacent waveguides, low-contrast waveguides must be spaced well apart to mitigate optical coupling between them. PLCs based on low-contrast waveguides, therefore, require a great deal of chip real estate to realize any significant functionality. In addition, the large-bending radii requirement of low-contrast waveguides precludes realization of some waveguide components, such as large free-spectral-range ring resonators, which require small bend radii.

High-contrast waveguides, on the other hand, employ core and cladding materials having a large difference in refractive index (typically 25-100%). As a result, a high-contrast waveguide more tightly confines optical energy to inside the core itself, realizing only small evanescent tail in the cladding (i.e., they are characterized by a relatively smaller mode-field profile). Light leakage in a high-contrast waveguide is mitigated and, therefore, high-contrast waveguides can be routed with tight bending radii and can also be spaced more densely than low-contrast waveguides. This enables PLCs that require very little chip real estate, by comparison with low-contrast waveguide-based PLCs.

Unfortunately, high-contrast waveguides typically exhibit relatively high propagation loss. Further, their small mode-field profile is not well matched to that of a conventional optical fiber, which leads to large optical loss when a high-contrast waveguide is optically coupled with a conventional optical fiber.

In order to improve optical coupling efficiency between a high-contrast waveguide and a conventional optical fiber, the waveguide-taper-based spotsize converter has been developed to effect a size change the mode-field profile at a waveguide facet so that the mode-field profile at the facet is more closely matched to that of an optical fiber.

Attempts to form such spotsize converters in the prior art have typically relied on waveguide regions comprising a one-dimensional taper in the lateral dimension, wherein the lateral taper is formed using conventional photolithography and etching. Examples of such devices are described in "Spotsize converters for rib-type silicon photonic wire waveguides," *Proceedings of the 5$^{th}$ International Conference on Group IV Photonics,* Sorrento, Italy, September 17-19, pp. 200-202 (2008) and "Low loss shallow-ridge silicon waveguides," *Optics Express,* Vol. 18, No. 14, pp. 14474-14479 (2010). Unfortunately, only marginal coupling efficiency improvement is obtained via such spotsize converters.

Of more promise, however, are spotsize converters that are tapered in two dimensions, such as described in "Low-Loss Compact Arrayed Waveguide Grating with Spotsize Converter Fabricated by a Shadow-Mask Etching Technique," *Electronics and Telecommunications Research Institute (ETRI) Journal,* Vol. 27, No. 1, pp. 89-94 (2005). While the structure of these spotsize converters shows great promise for low fiber-to-chip coupling losses, shadow-mask etching is extremely difficult to control. As a result, spotsize converters fabricated in this manner are expensive to produce in volume and are likely to suffer from variations in performance as well, making them difficult, at best, to commercialize.

Historically, the drawbacks associated with high-contrast-waveguide-based PLCs has limited their use in telecommunications or data communications applications. As a result, they are primarily used in applications where optical loss of less concern, such as sensor applications.

A low-cost, reproducible surface-waveguide technology that has low optical propagation loss, supports tight bending radii and dense integration, and that can be efficiently optically coupled with external devices, such as optical fibers, lasers, detectors, and the like, would represent a significant advance in the state-of-the-art.

SUMMARY OF THE INVENTION

The present invention enables formation of a surface waveguide having a high-contrast region, a low-contrast region, and a transition region operative as a spotsize converter between the high-contrast and low-contrast regions. The transition region enables adiabatic conversion of the mode-field profile of a light signal between a tightly confined mode-field in the high-contrast region and a loosely confined mode-field in the low-contrast region. The present invention further enables fabrication of spotsize converters with improved reproducibility and greater processing tolerance as compared to prior-art spotsize converters. As a result, PLCs in accordance with the present invention can have high surface-waveguide density, tight waveguide bending radii, exhibit low optical-propagation loss, and can be optically coupled to external devices with high efficiency. In addition, PLCs in accordance with the present invention can be fabricated more reproducibly and less expensively than spotsize converters of the prior art. Embodiments of the present invention are particularly well suited for use in applications such as telecommunications, data communications, and optical sensors.

An illustrative embodiment of the present invention comprises a stripe waveguide having a first region that is characterized by a high index contrast, a second region that is characterized by low index contrast, and a transition region between them. The transition region defines a spotsize converter that adiabatically transitions the mode-field profile between a relatively larger mode field in the low-contrast region and a relatively smaller mode field in the high-contrast region. The surface waveguide includes a core through which an optical mode of a light signal can propagate. In the high-contrast region, the core comprises two layers of silicon nitride that are optically coupled but physically separated by a thin silicon dioxide layer. The silicon dioxide layer is formed such that it is thin enough to enable optical coupling of the two silicon nitride layers such that they collectively support propagation of the light signal, while also mitigating perturbation of the optical mode as it propagates through the silicon nitride layers. In the transition region, one of the two silicon nitride layers is tapered from its as-deposited thickness to extinction. As a result, in the low-contrast region, the core comprises only one layer of silicon nitride.

In contrast to spotsize converters of the prior art, the core in the low-index region is not exposed to an etchant; therefore, its material retains its as-deposited optical quality and thickness. As a result, the tapering process does not deleteriously affect propagation of light through the low-contrast region. Further, since the thickness of the core material in the low-contrast region is determined by deposition thickness instead of a timed etch, it can be controlled with greater precision. As a result, spotsize converters in accordance with the present invention are more reproducible and have better optical performance than prior-art spotsize converters.

A method for forming a waveguide in accordance with the present invention includes depositing a first layer of silicon nitride on a substrate, wherein the first layer of silicon nitride has a thickness suitable for the core of the low-index region. A thin layer of silicon dioxide is then deposited on the first layer of silicon nitride, followed by deposition of a second layer of silicon nitride that is relatively thicker than the first layer of silicon nitride. The second layer of silicon nitride, the first layer of silicon nitride, and the silicon dioxide layer collectively define the thickness of the core in the high-index region. The second layer of silicon nitride is then etched to form a vertical taper in a transition region between the low-contrast and high-contrast regions. This taper etch tapers the thickness of the second layer of silicon nitride from its as-deposited thickness in the high-contrast region to extinction in the low-contrast region. During this tapering process, the silicon dioxide layer acts as a stop-etch layer for the taper etch and also protects the first layer of silicon nitride from exposure to the taper etch. Once this taper is defined, additional silicon dioxide is deposited to form an upper cladding for the waveguide. In some embodiments, the core layers are etched to define the lateral dimensions of the waveguide before the upper cladding material is deposited. Since the first layer of silicon nitride is never exposed to the taper etch, it retains its as-deposited quality, mitigating any influence the etching might have on propagation of an optical signal through this material.

In some embodiments, a relatively thinner layer of silicon nitride is deposited on a relatively thicker layer of silicon nitride after the thicker layer has been tapered to define a transition region. In some of these embodiments, the two layers of silicon nitride are separated by a thin layer of silicon dioxide. In some of these embodiments, the two layers of silicon nitride are not separated by a thin layer of silicon dioxide.

An embodiment of the present invention comprises an article comprising a waveguide having a core, the core including: a first layer comprising a first material, the first layer including a tapered region having a thickness that changes monotonically from a first thickness to extinction; and a second layer comprising the first material; wherein the first layer and second layer collectively support propagation of light.

BRIEF DESCRIPTION OF THE DRAWINGS

FIGS. 2A-B depict schematic drawings of cross-sectional and top views, respectively, of a portion of a surface waveguide in accordance with an illustrative embodiment of the present invention.

FIGS. 4A-C depict schematic drawings of side views of a portion of waveguide 200 at different points during its formation in accordance with the illustrative embodiment of the present invention.

FIGS. 6A-C depict schematic drawings of side views of a portion of waveguide 200 at different points during the formation of vertical taper 226.

FIG. 7 depicts a schematic drawing of a cross-sectional view of a portion of a surface waveguide in accordance with a first alternative embodiment of the present invention.

FIG. 8 depicts a schematic drawing of a cross-sectional view of a portion of a surface waveguide in accordance with a second alternative embodiment of the present invention. Waveguide 800 is a stripe waveguide suitable for conveying light signal 202.

DETAILED DESCRIPTION

Figure 1A:
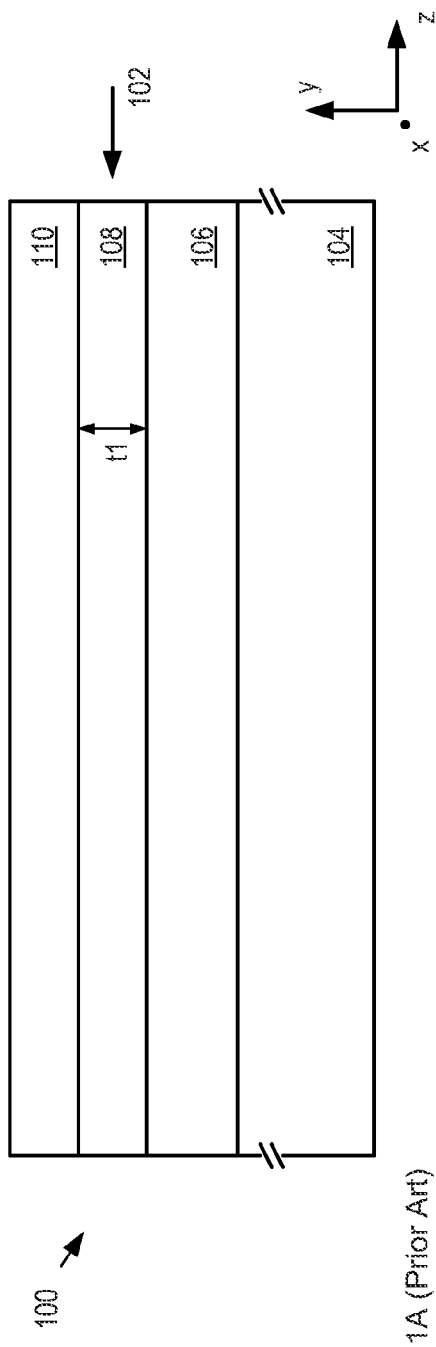
FIG. 1A depicts a schematic drawing of a cross-sectional view of a conventional surface waveguide having a thick core layer in accordance with the prior art.

FIG. 1A depicts a schematic drawing of a cross-sectional view of a conventional surface waveguide having a thick core layer in accordance with the prior art.

Waveguide 100 is a surface waveguide having a core that is patterned to define a stripe (hereinafter referred to as a "stripe waveguide"). Waveguide 100 comprises lower cladding 106, core layer 108, and upper cladding 110, which are formed on substrate 104. For the purposes of the present Specification, including the appended claims, the terms "Disposed on" or "Formed on" are defined as "exists on or above" an underlying material or layer either in direct physical contact or with one or more intervening layers. For example, if a material is described to be "disposed (or grown) on a substrate," this can mean that either (1) the material is in intimate contact with the substrate; or (2) the material is in contact with one or more layers that already reside on the substrate.

Each of lower cladding layer 106 and upper cladding layer 110 is a layer of silicon dioxide having thickness of several microns. Lower cladding layer 106 is also typically sufficiently thick to substantially isolate the optical mode of light signal 102 from substrate 104 as the light propagates through core layer 108.

Core layer 108 is a layer of silicon nitride having thickness t1. One skilled in the art will recognize that the effective refractive index of core layer 108 is determined by its thickness. The thickness, t1, of core layer 108 is selected such that its effective refractive index is much greater than the refractive index of the silicon dioxide of lower cladding layer 106 and upper cladding layer 110. As a result, lower cladding layer 106, core layer 108, and upper cladding layer 110 collectively define a high-contrast waveguide structure.

Figure 1B:
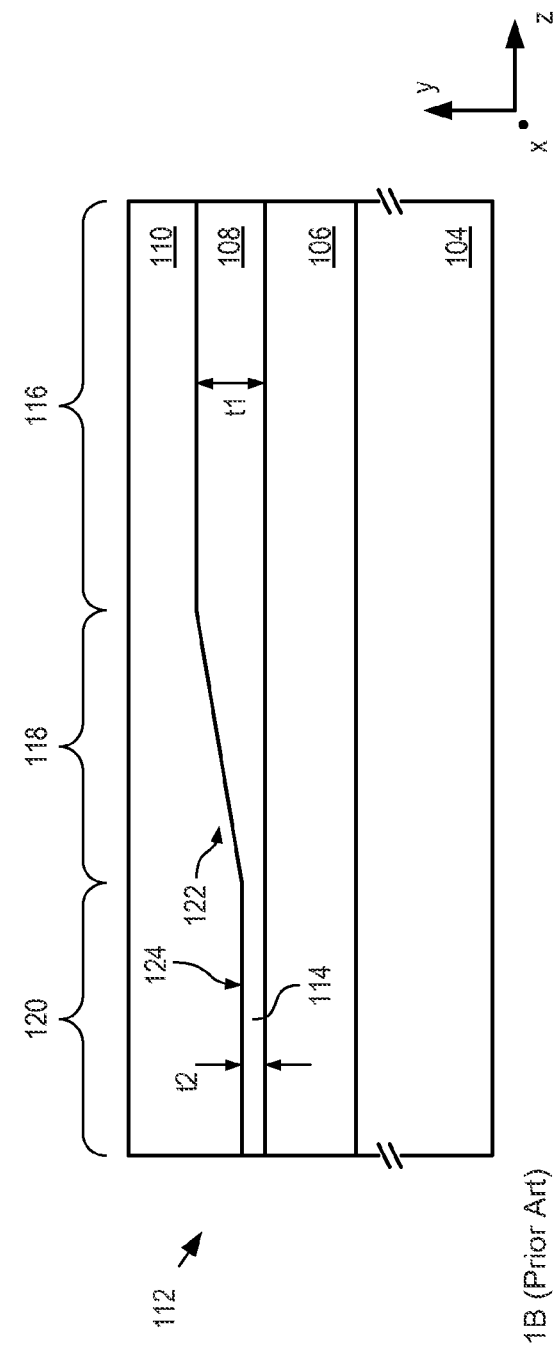
FIG. 1B depicts a schematic drawing of a cross-sectional view of a conventional surface waveguide having a core layer that is vertically tapered down to a relatively thinner core region in accordance with the prior art.

FIG. 1B depicts a schematic drawing of a cross-sectional view of a conventional surface waveguide having a core layer that is vertically tapered down to a relatively thinner core region in accordance with the prior art.

Waveguide 112 is analogous to waveguide 100; however, waveguide 112 includes transition region 118, which optically couples high-contrast region 116 and low-contrast region 120.

High-contrast region 116 is a portion of waveguide 112 that is substantially identical to waveguide 100, since its constituent layers are unchanged from the layers that compose waveguide 100.

Transition region 118 is a region wherein the thickness of core layer 108 is tapered from its as-deposited thickness, t1, in high-contrast region 116, to the thickness, t2, of low-contrast core 114 to define taper 122. As a result, transition region defines a spotsize converter that enables an adiabatic transition between the relatively smaller mode-field in high-contrast region 116 to the relatively larger mode-field in low-contrast region 120.

Taper 122 is formed by a conventional taper etch, such as shadow-mask etching or gray-scale lithography combined with sacrificial mask etching, wet etching, etc. It should be noted that, in addition to forming taper 122, the taper etch also reduces the thickness of core layer 108 to t2 in low-contrast region 120. The value of t2 is determined by the duration of the taper etch process.

Low-contrast region 120 comprises lower cladding 106, low-contrast core 114, and upper cladding 110. The thickness, t2, of low-contrast core 114 is selected to achieve an effective refractive index for low-contrast core 114 that is only slightly higher than that of the silicon dioxide of lower cladding layer 106 and upper cladding layer 110. As a result, lower cladding layer 106, low-contrast core 114, and upper cladding layer 110 collectively define a low-contrast waveguide structure.

One skilled in the art will recognize that the thickness, t2, of low-contrast core 114 is a critical parameter for waveguide 112 and is determined by the amount of time that core layer 108 is etched during formation of taper 122.

Unfortunately, it is difficult to control the value of t2 using a conventional taper etch for several reasons. First, it is difficult to control etch duration with the accuracy necessary to ensure uniform and repeatable optical characteristics for waveguide 112. Second, variations in each of etch gas flow, etchant concentration, temperature, and chamber pressure can affect the rate at which core layer 108 is etched. Third, variation in etch depth across a wafer is typical, which can result in waveguides fabricated on the same substrate having different optical characteristics.

In addition, when core layer 108 is etched to reduce its thickness, a residual roughness is commonly defined in surface 124. Surface roughness is a significant contributor to optical propagation loss in a surface waveguide.

It is an aspect of the present invention that the thickness of a low-contrast core can be more tightly controlled by controlling the deposition thickness of the layer from which it is formed, rather than by controlling the amount of the layer removed by etching. It is another aspect of the present invention that by avoiding exposure of this layer to etching, the as-deposited optical quality of the low-contrast core material is preserved. As a result, embodiments of the present invention enable improved repeatability, uniformity, and reduced cost and complexity, as compared to the prior art.

FIGS. 2A-B depict schematic drawings of cross-sectional and top views, respectively, of a portion of a surface waveguide in accordance with an illustrative embodiment of the present invention. Waveguide 200 is a stripe waveguide suitable for conveying light signal 202. Waveguide 200 is formed on substrate 204 and includes high-contrast region 206, transition region 208, and low-contrast region 210.

High-contrast region 206 includes lower cladding layer 212, lower core 214, central core 216, upper core 218, and upper cladding layer 220.

Transition region 208 comprises lower cladding layer 212, lower core 214, central core 216, vertical taper 226, lateral taper 228, and upper cladding layer 220. Transition region 208 enables a spotsize converter that controls the size and shape of the optical mode of light signal 202 as it passes between high-contrast region 206 and low-contrast region 210. As discussed above, spotsize converters having only lateral tapers are known in the prior art; however, the performance of such spotsize converters is limited because they control the size of the mode field primarily in only one dimension. In some embodiments, both a lateral and vertical taper are included in transition region 208. The present invention, therefore, can enable control over the complete profile of the mode field and can yield spotsize converters with improved performance, thus affording some embodiments of the present invention with significant advantage over the prior art.

Low-contrast region 210 includes lower cladding layer 212, lower core 214, and upper cladding layer 220.

Figure 3:
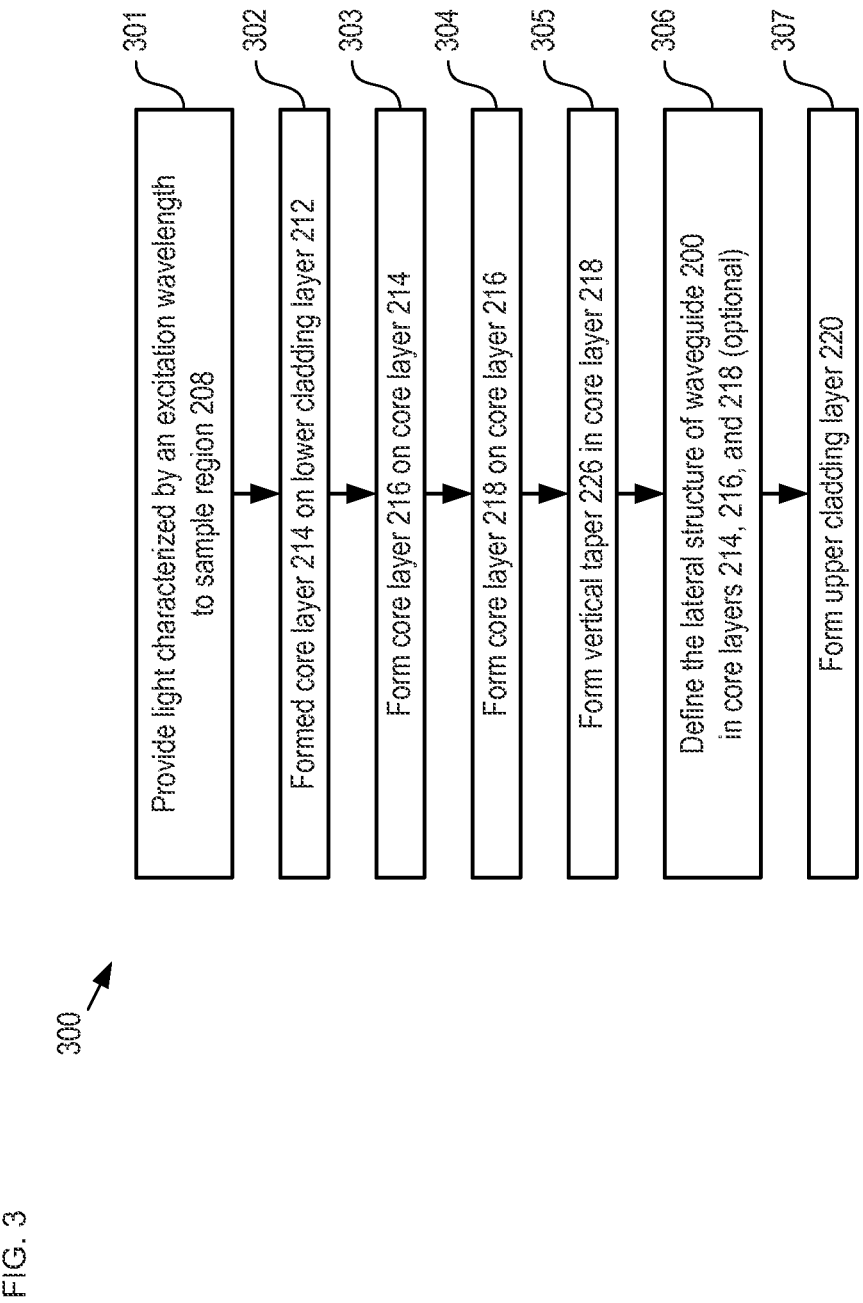
FIG. 3 depicts operations of a method suitable for forming a surface waveguide in accordance with the illustrative embodiment of the present invention.

FIG. 3 depicts operations of a method suitable for forming a surface waveguide in accordance with the illustrative embodiment of the present invention. Method 300 begins with operation 301, wherein lower cladding layer 212 is formed on substrate 204.

FIGS. 4A-C depict schematic drawings of side views of a portion of waveguide 200 at different points during its formation in accordance with the illustrative embodiment of the present invention.

Substrate 204 is a conventional silicon substrate. In some embodiments, substrate 204 is a different substrate that is suitable for use in the fabrication of surface waveguides. Materials suitable for use in substrate 204 include, without limitation, glass substrates, SOI substrates, compound semiconductor substrates, ceramic substrates, other semiconductor substrates (e.g., germanium, silicon carbide, etc.), and the like.

Lower cladding layer 212 is a layer of silicon dioxide formed on the top surface of substrate 204 via conventional methods, such as thermal oxidation, low-pressure chemical-vapor deposition (LPCVD), plasma-enhanced chemical-vapor deposition (PECVD), spin-on techniques, sputtering, wafer bonding, etc. Lower cladding layer 212 has a thickness of approximately 8 microns. Typically, lower cladding layer 212 has a thickness within the range of approximately 2 microns to approximately 15 microns, although other thicknesses are within the scope of the present invention. In some embodiments, lower cladding layer 212 comprises one or more materials other than silicon dioxide, such as a different silicon oxide, or other dielectric. One skilled in the art will recognize that in order to perform as a cladding layer for waveguide 202, the refractive index of lower cladding layer 212 must be lower than the effective refractive index of cores 222 and 224, as described below. It will be clear to one skilled in the art how to specify, make, and use lower cladding layer 212. Further, in some embodiments, substrate 204 comprises a material, such as fused silica or another glass, which is suitable for use as a lower cladding for waveguide 200. In some of these embodiments, lower cladding layer 212 is not included and substrate 204, itself, operates as the lower cladding for waveguide 200.

At operation 302, core layer 402 is formed on lower cladding layer 212 such that the layers are in direct physical contact.

Core layer 402 is a layer of LPCVD-deposited stoichiometric silicon nitride. Core layer 402 has a thickness, t3, of approximately 40 nanometers (nm). The thickness of core layer 402 is selected based on a desired mode-field profile for optical signal 202 in low-index region 210. Typically, core layer 402 has a thickness within the range of approximately 10 nm to approximately 100 nm, although other thicknesses are within the scope of the present invention.

At operation 303, core layer 404 is formed on core layer 402.

Core layer 404 is a layer of LPCVD-deposited, TEOS-based silicon dioxide formed in direct contact with core layer 402. Core layer 404 has a thickness of approximately 100 nm. The thickness of core layer 404 is selected to enable optical coupling of lower core 212 and upper core 218 such that these layers collectively support propagation of light signal 202, while also mitigating perturbation of the optical signal as it propagates through waveguide 200. Typically, core layer 404 has a thickness within the range of approximately 10 nm to approximately 500 nm. The material used in core layer 404 is selected so that the layer also acts as a stop-etch layer during the formation of taper 226, as described below. One skilled in the art will recognize, after reading this Specification, that the material used in core layer 404 will depend upon the choice of materials for core layers 402 and 406, as well as the wavelength of optical signal 202.

At operation 304, core layer 406 is formed on core layer 404.

Core layer 406 is a layer of LPCVD-deposited stoichiometric silicon nitride formed in direct contact with core layer 404. Core layer 406 has a thickness, t4, of approximately 200 nm. Typically, core layer 406 the value of t4 is within the range of approximately 100 nm to approximately 300 nm, although other thicknesses are within the scope of the present invention.

FIG. 4A depicts a cross-sectional view of waveguide 200 after the formation of core layers 402, 404, and 406.

One skilled in the art will recognize that the thicknesses and materials of core layers 402, 404, and 406 are a matter of design choice and is based on the wavelengths of light in light signal 202, as well as the application for which the waveguide 200 is intended. Materials suitable for use in core layers 402, 404, and 406 include any material that is substantially transparent for the wavelength of operation, such as stoichiometric silicon nitride, non-stoichiometric silicon nitride, silicon-rich silicon nitride, other dielectrics, doped glasses, semiconductors, silicon compounds (e.g., silicon carbide, silicon-germanium, etc.), compound semiconductors, and the like.

At operation 305, vertical taper 226 is formed in core layer 406.

Vertical taper 226 is a substantially linear taper whose thickness changes monotonically from the as-deposited thickness of core layer 406 (i.e., t4) at its boundary with high-contrast region 206 to zero (i.e., extinction) at its boundary with low-contrast region 210.

Figure 5:
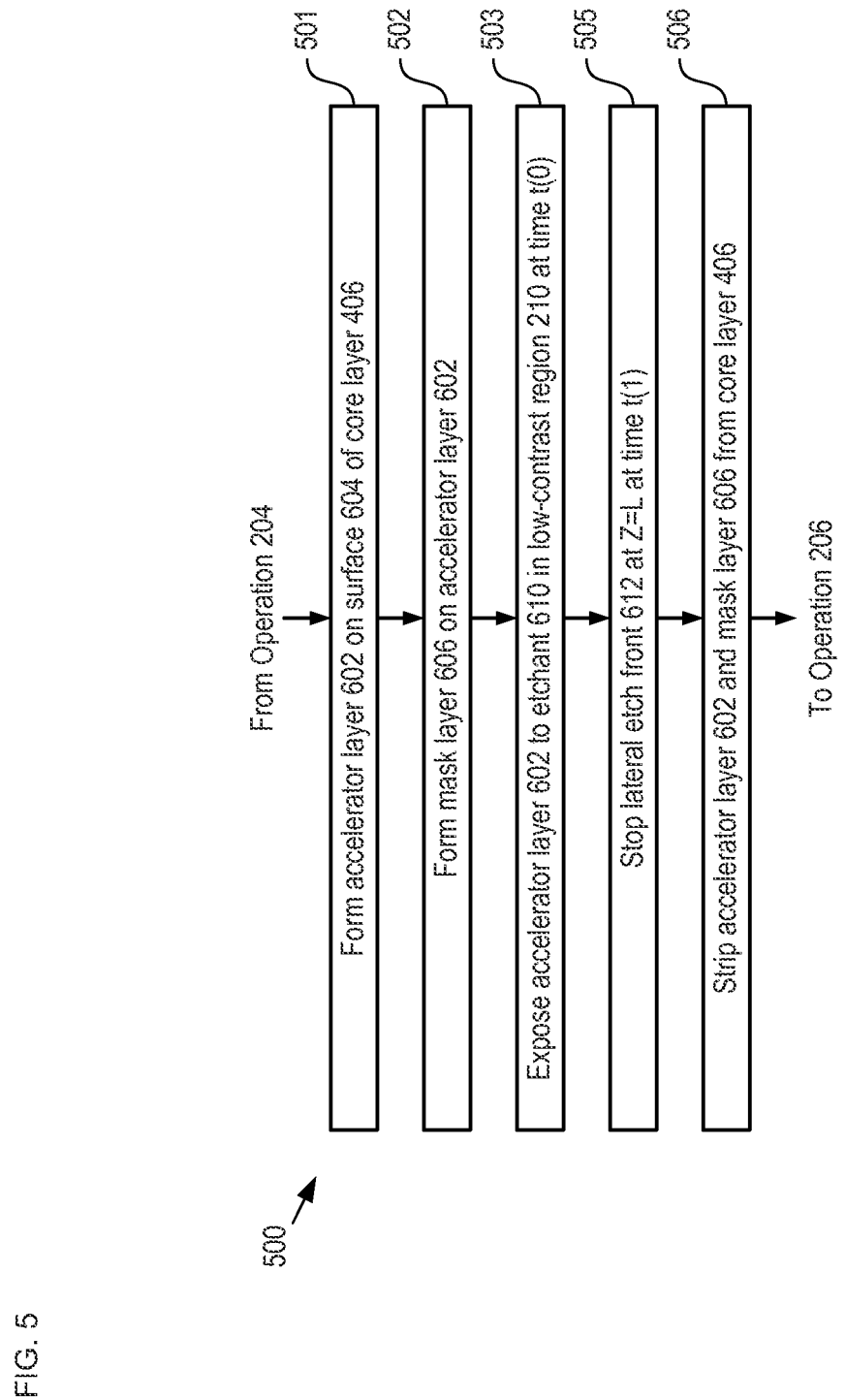
FIG. 5 depicts a sub-method suitable for use in operation 305.

FIG. 5 depicts sub-operations of a sub-method suitable for use in operation 305. Sub-method 500 begins with sub-operation 401, wherein accelerator layer 602 is formed on surface 604 of core layer 406. Sub-method 500 is analogous to tapering methods described in U.S. patent application Ser. No. 13/451,957, filed Apr. 20, 2012, and which is incorporated herein in its entirety. In some embodiments, vertical taper 226 is formed using another suitable method for forming a shaped vertical profile in a layer, such as shadow-mask etching, reactive ion-etching through a sacrificial, graded-thickness mask (e.g., formed using gray-scale lithography, etc.), wet etching, and the like. In some embodiments, vertical taper 226 has a profile other than a linear taper.

FIGS. 6A-C depict schematic drawings of side views of a portion of waveguide 200 at different points during the formation of vertical taper 226.

Accelerator layer 602 comprises a sacrificial material that is etched by an etchant that also etches the material of core layer 406 but that does not substantially etch the material of core layer 404. The material of accelerator layer 602 is selected such that it etches at a rate suitable for forming taper 226 at taper angle, $\theta 1$, in core layer 406. In the illustrative embodiment, accelerator layer 602 comprises titanium and chrome; however the material of accelerator layer 602 is a matter of design choice and will depend on the material of core layer 406, the desired taper angle, and available etchants.

At sub-operation 502, mask layer 606 is formed and patterned on accelerator layer 602. Mask layer 606 is patterned to expose surface 608 of accelerator layer 606 in low-contrast region 210, but protect surface 608 in transition region 208 and high-contrast region 206. The edge of mask layer 606 is located at z=0.

FIG. 6A depicts waveguide 200 after the formation of mask layer 606.

At sub-operation 503, the portion of accelerator layer 602 exposed by mask 606 is exposed to etchant 610 at time t(0).

Etchant 610 comprises a chemical (e.g., nitric acid, etc.) that etches the material of accelerator layer 602 at a desired etch rate relative to the rate at which it etches the material of core layer 406. As a result, accelerator layer 602 is removed in low-contrast region 210 and etchant 610 begins to attack the now exposed underlying core layer 406 uniformly across low-contrast region 210. Simultaneously, etchant 610 begins to etch accelerator layer 602 laterally under mask layer 606, forming lateral etch front 612, which travels along the z-direction from Z=0 toward Z=L1, exposing surface 604 as it proceeds along the z-direction. In some embodiments, accelerator layer 602 is removed from a portion of low-contrast region 210 via a different etch (e.g., a directional reactive-ion etch) that removes its material selectively over the material of core layer 406. This ensures a clean starting condition in this portion of low-contrast region 210 for the lateral etching of accelerator layer 602 in transition region 208. It can also improve the uniformity of the vertical etching of core layer 406 in low-contrast region 210. During sub-operation 503, etch front 612 moves along the z-direction at a substantially constant velocity, thus the portion of surface 516 exposed to etchant 610 increases linearly with time.

FIG. 6B depicts a cross-sectional view of waveguide 200 during sub-operation 503.

At sub-operation 504, the etching of core layer 406 by etchant 610 is stopped at time t(1). Time t(1) is selected based on the etch rate of the material of core layer 406 in etchant 610, the as-deposited thickness, t4, of core layer 406, and the desired length, L1, of taper 226.

It should be noted that no etching of core layer 406 occurs in high-contrast region 206 because etchant 610 has no time to attack core layer 406 beyond Z=L1. From Z=0 to Z=L1, the exposure time of core layer 406 to etchant 610 is a linearly decreasing function of distance along the z-direction. Etchant 610, therefore, leaves a linearly increasing thickness of core layer 406, from zero thickness to a thickness of t4, along its length from Z=0 to Z=L1. In some embodiments, t4 is a thickness other than the as-deposited thickness of core layer 406. For example, in some embodiments, some or all of core layer 406 is thinned to reduce its thickness in at least the region where vertical taper 226 is formed. It should also be noted that the magnitude of the taper angle, θ1 is dependent upon the relative etch rates of the materials of accelerator layer 602 and core layer 406 in etchant 610. The relationship between θ1 and these etch rates can be described as:

$$\theta 1 = \tan^{-1}\left(\frac{ER1}{ER2}\right),$$

where ER1 is the etch rate of the material of core layer 406 and ER2 is the etch rate of the material of accelerator layer 602 in etchant 610.

Further, in low-contrast region 210, core layer 402 is not exposed to etchant 610 because core layer 404 acts as an etch stop, thereby protecting underlying core layer 402.

Still further, the repeatability of the structure of taper 226 is extremely high because its formation is substantially insensitive to over etching. This is due to the fact that, once core layer 406 is removed in low-contrast region 210, the shape of taper 226 is fixed. Any overetching beyond the point where etchant 520 reaches core layer 404 merely shifts the position of taper 226 along the z-direction due to substantially uniform lateral etching of the material of core layer 406.

FIG. 6C depicts a cross-sectional view of waveguide 200 after sub-operation 504.

At sub-operation 505, accelerator layer 602 and mask layer 606 are stripped from core layer 406.

Returning now to FIGS. 2 through 4, FIG. 4B depicts a cross-sectional view of waveguide 200 after removal of accelerator layer 602 and mask layer 606.

At optional operation 306, the lateral structure of waveguide 200 is defined in core layers 402, 404, and 406.

The lateral structure of the core regions of waveguide 200 are defined by patterning core layers 402, 404, and 406 to define lower core 214, central core 216, and upper core 218. Core layers 402, 404, and 406 are laterally defined via conventional techniques, such as photolithography and a directional reactive-ion etch. It will be clear to one skilled in the art, after reading this Specification, how to define the lateral structure of waveguide 200.

During the lateral definition of the core regions of waveguide 200, lateral taper 228 is also defined. Lateral taper 228 is defined such that its width increases linearly along length L2 from w1 to width w2 to define sidewall angles θ2. L2 and θ2 are selected to enable the adiabatic conversion of the lateral dimensions of the mode-field profile between high-contrast region 206 and low-contrast region 210. In some embodiments, lateral taper 228 and vertical taper 226 are co-located. In some embodiments, w1 is greater than w2. In some embodiments, lateral taper 228 is located in high-contrast region 206.

It should be noted that, in the illustrative embodiment, transition region 208 enables the adiabatic transition of a mode-field profile that maintains a substantially circular cross-section between low-contrast region 210 and high-contrast region 206. In some embodiments, at least one of high-contrast region 206 and low-contrast region 210 gives rise to a mode-field profile other than circular. In some embodiments, low-contrast region 210 gives rise to a mode-field profile that is matched to an external device other than a conventional optical fiber, such as a laser, detector, modulator, sensor element, and the like.

At operation 307, upper cladding layer 220 is formed.

FIG. 4C depicts a cross-sectional view of waveguide 200 after the formation of upper cladding 220.

Upper cladding layer 220 is a layer of LPCVD-deposited TEOS-based silicon dioxide formed in direct contact with core layer 218. Upper cladding layer 220 has a thickness of approximately 8 microns. Typically, upper cladding layer 220 has a thickness within the range of approximately 2 microns to approximately 15 microns. In some embodiments, upper cladding layer 220 comprises a material other than LPCVD-deposited TEOS-based silicon dioxide. Materials suitable for use in upper cladding layer 220 include, without limitation, LPCVD-deposited silicon oxides, PECVD-deposited silicon oxides, spin-on glasses, other dielectrics, and the like.

Upon formation of upper cladding layer 220, waveguide 200 is complete and includes high-contrast region 206 and low-contrast region 210, which are optically coupled by transition region 208.

As discussed above, core layer 402 is never exposed to etchant 610. As a result, the material of core layer 402 retains its pristine, as-deposited optical quality and layer thickness—even after taper 226 has been defined. It is an aspect of the present invention, therefore, that the optical quality of low-contrast region 210 of waveguide 210 is not compromised by the formation of transition region 208 (i.e., the addition of a spotsize converter). This enables the embodiments of the present invention to exhibit improved low-loss propagation and/or improved low-loss optical coupling to external devices.

FIG. 7 depicts a schematic drawing of a cross-sectional view of a portion of a surface waveguide in accordance with a first alternative embodiment of the present invention.

Waveguide 700 is a stripe waveguide suitable for conveying light signal 202. Waveguide 700 is formed on substrate 204 and, in analogous fashion to waveguide 200, includes high-contrast region 702, transition region 704, and low-contrast region 706. Waveguide 700 is analogous to waveguide 200, described above, however the layer structure of the core of waveguide 700 is reversed from that of waveguide 200.

Lower core 708 is analogous to upper core 218; however, lower core 708 is formed from a layer that is deposited directly on lower cladding layer 212.

Taper 714 is analogous to taper 226, and is typically formed as described above.

Central core 710 is analogous to central core 216; however, central core 710 is formed such that it is conformally deposited directly on lower core 708. As a result, central core 710 conforms to taper 714, as shown.

Upper core 712 is analogous to lower core 214, described above; however, lower core 712 is formed from a layer that it is conformally deposited directly on the layer from which central core 710 is formed. Since the thickness of upper core 712 is determined by the deposition of its nascent layer, it can be controlled more accurately than can be achieved by etching a thicker layer to reduce it to a desired thickness. Furthermore, since upper core 712 is never exposed to an etchant, it retains its as-deposited optical quality.

As described above, central core 710 is sufficiently thin that lower core 708 and upper core 712 are optically coupled in a manner that mitigates perturbation of optical signal 202 as it propagates through waveguide 700. In other words, as light signal 202 propagates through waveguide 700, its mode-field profile adiabatically transitions between a tightly confined optical mode in high-contrast region 702 and a loosely confined optical mode in low-contrast region 706.

FIG. 8 depicts a schematic drawing of a cross-sectional view of a portion of a surface waveguide in accordance with a second alternative embodiment of the present invention. Waveguide 800 is a stripe waveguide suitable for conveying light signal 202. Waveguide 800 is formed on substrate 204 and includes high-contrast region 802, transition region 804, and low-contrast region 806.

Waveguide 800 is analogous to waveguide 700, described above; however, waveguide 800 does not include central core 710 between lower core 708 and upper core 712.

As a result, in high-contrast region 802, waveguide core 808 is collectively defined by only core layers 708 and 712.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An article comprising a surface waveguide having a core, wherein the surface waveguide includes:
   (1) a first region in which the core includes;
      (a) a first layer comprising a first material, the first layer having a first thickness;
      (b) a second layer comprising the first material; and
      (c) a third layer that is between the first layer and the second layer, the third layer comprising a second material, wherein the third layer enables optical coupling of the first layer and second layer such that they collectively support propagation of a light signal in the first region such that it has a first mode-field profile;
   (2) a second region in which the core includes the second layer and not the first layer, wherein the core in the second region supports propagation of the light signal such that it has a second mode-field profile; and
   (3) a transition region in which the core includes;
      (a) the first layer, wherein the first layer has a thickness that changes monotonically from the first thickness to extinction;
      (b) the second layer; and
      (c) the third layer;
   wherein the transition region is between the first region and the second region, and wherein the transition region is operative for adiabatically transitioning the mode-field profile of the light signal between the first mode-field profile and the second mode-field profile.

2. The article of claim 1, wherein the third layer has a thickness that is less than or equal to 500 nm.

3. The article of claim 1, wherein the second layer is between the substrate and the first layer.

4. The article of claim 1, wherein the first material comprises silicon nitride and the second material comprises a silicon oxide.

5. The article of claim 1, wherein the first layer includes a second tapered region, the second tapered region having a width that changes monotonically from a first width to a second width.

6. The article of claim 5, wherein the first tapered region and the second tapered region are co-located.

7. The article of claim 1, wherein the second layer has a second thickness that is thinner than the first thickness.

8. The article of claim 1, wherein the first layer is between the substrate and the second layer.

9. A method for forming a surface waveguide on a substrate, the surface waveguide having a first region, a second region, and a transition region that optically couples the first region and second region, the method comprising:
   (1) providing a first layer comprising a first material;
   (2) forming a second layer comprising the first material;
   (3) forming a third layer, wherein the third layer comprises a second material, and wherein the third layer is formed between the first layer and the second layer,
   (4) etching the first layer to form a first tapered region in the transition region, wherein the first layer is etched such that the first tapered region has a thickness that changes monotonically from a first thickness to extinction, and wherein the first layer is etched via operations including:
      (a) forming an accelerator layer on the first layer, the accelerator layer including a third material;
      (b) forming a mask layer on the accelerator layer; and
      (c) laterally etching the accelerator layer in a first etchant that etches each of the first material and the third material; and
   (5) removing the first layer in the second region;
   wherein the first layer, second layer, and third layer are formed such that the third layer optical couples the first layer and second layer such that the first layer and second layer collectively support propagation of light in the first region.

10. The method of claim 9, wherein the third layer is formed such that it has a thickness that is less than or equal to 500 nm.

11. The method of claim 9, wherein the second layer is formed between the substrate and the third layer.

12. The method of claim 9, wherein the first material comprises silicon nitride and the second material comprises a silicon oxide.

13. The method of claim 9, wherein the first layer is between the substrate and the second layer, and wherein the first tapered region is formed prior to the formation of the second layer.

14. The method of claim 9, further comprising (6) forming a second tapered region in the first layer, wherein the second tapered region has a width that changes monotonically from a first width to a second width.

15. The method of claim 14, wherein the second tapered region and the first tapered region are formed such that they are co-located.

16. A method for forming a surface waveguide having a first region, a second region, and a transition region that optically couples the first region and second region, the method comprising:
    providing a first cladding layer, the first cladding layer comprising a first silicon oxide;
    forming a first core layer, the first core layer having a first thickness, and the first core layer comprising silicon nitride;
    forming a second core layer above the first core layer, the second core layer having a second thickness, and the second core layer comprising silicon nitride;
    forming a third core layer that comprises a silicon oxide, wherein the third core layer is formed between the first core layer and the second core layer;
    etching the first core layer to form a first tapered region in the transition region, the first tapered region having a thickness that changes monotonically from a third thickness to extinction; and
    forming a second cladding layer, the second cladding layer comprising a second silicon oxide;
    wherein the first core layer, second core layer, and third core layer are formed between the first cladding layer and second cladding layer; and
    wherein the third core layer optically couples the first core layer and second core layer such that the first core layer and second core layer collectively support propagation of light in the first region.

17. The method of claim 16, wherein etching the first core layer removes it in the low-contrast region.

18. The method of claim 16, further comprising forming a second tapered region in the first core layer, wherein the second tapered region has a width that changes monotonically from a first width to a second width.

19. The article of claim 1, wherein the transition region is operative for adiabatically transitioning the mode-field profile of the light signal between the first mode-field profile and the second mode-field profile, and wherein the first mode-field profile and second mode-field profile have substantially the same cross-sectional shape, and further wherein the second mode-field profile is larger than the first mode-field profile.

20. The article of claim 19, wherein the cross-sectional shape is substantially circular.

* * * * *